United States Patent [19]

Naef et al.

[11] Patent Number: 4,908,040

[45] Date of Patent: Mar. 13, 1990

[54] ANIONIC CYCLODIYLIDE COMPOUNDS, THEIR PREPARATION AND USE IN WASHING AGENTS AS SHADING DYES

[75] Inventors: Rudolf Naef, Lupsingen, Switzerland; Claude Eckhardt, Riedisheim, France

[73] Assignee: Ciba-Geigy Corporation, Ardsley, N.Y.

[21] Appl. No.: 113,311

[22] Filed: Oct. 28, 1987

[30] Foreign Application Priority Data

Nov. 7, 1986 [CH] Switzerland ............... 4454/86

[51] Int. Cl.$^4$ .................. C09B 23/00; D06M 1/18
[52] U.S. Cl. .................. 8/137; 8/115.62; 8/115.66; 8/636; 8/648; 558/426
[58] Field of Search ............ 558/426; 8/137, 115.62, 8/115.66, 636, 648

[56] References Cited

U.S. PATENT DOCUMENTS 3,408,367  10/1968  Andreades .................. 558/426

FOREIGN PATENT DOCUMENTS 270489  6/1988  European Pat. Off. ............ 558/426
3203656  8/1988  Japan .................. 558/426

OTHER PUBLICATIONS

Y. Slominskii et al., Journal of Organic Chemistry of the U.S.S.R., pp. 1786-1793 (Feb. 10, 1986).
Chem. Abstract 79: 91816r (Oct. 15, 1973).
Chem. Abstract 77: 114095e (Oct. 23, 1972).
Chem. Abstract 104: 33972n (Feb. 3, 1986).

*Primary Examiner*—William R. Dixon, Jr.
*Assistant Examiner*—Jerry D. Johnson
*Attorney, Agent, or Firm*—Edward McC. Roberts

[57] ABSTRACT

Compounds of the formula

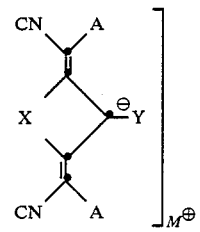

in which X, Y, A and M are as defined in claim 1, a process for their preparation and their use as shading dyes in washing agents.

6 Claims, No Drawings

ANIONIC CYCLODIYLIDE COMPOUNDS, THEIR PREPARATION AND USE IN WASHING AGENTS AS SHADING DYES

The invention relates to novel anionic cyclodiylide compounds of the formula

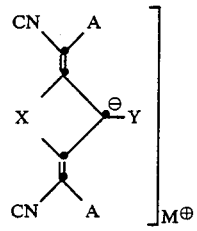
(I)

in which X is a substituted or unsubstituted, 5- and or 6-membered monocyclic or polycyclic aromatic or hetaromatic radical, Y is hydrogen or a substituted or unsubstituted, alkenyl, alkyl or cycloalkyl radical having 1 to 6 carbon atoms or a 5- and/or 6-membered monocyclic or polycyclic aromatic or hetaromatic radical, A is CN or a carbonyl compound, M is an alkali metal or ammonium ion, subject to the proviso that X is not unsubstituted phenylene when Y is hydrogen or unsubstituted phenyl.

The radical X is for example a vicinally or peri-bonded pyrrole, pyrazole, imidazole, furan, thiophene, benzene, pyridine, pyridazine, pyrimidine, pyrazine, indolizine, indole, isoindole, benzofuran, benzothiophene, benzothiazole, benzoxazole, naphthalene, quinoline, isoquinoline, cinnoline, phthalazine, quinazoline, quinoxaline, anthracene, acridine, phenanthrene and phenanthridine radical in one of the possible positionally isomeric forms.

Perferably, X is a pyridine, pyridazine, pyrimidine, pyrazine, naphthalene, quinoline, benzothiazole, benzoxazole or a benzene radical, in particular an unsubstituted benzene radical.

Y in the meaning of substituted or unsubstituted alkenyl, alkyl or cycloalkyl having 1 to 6 carbon atoms is for example: methyl, ethyl, n-propyl, n-butyl, n-pentyl, n-hexyl and the corresponding isomeric radicals and also ethenyl, cyclopentyl, cyclohexyl, cyclopentenyl or cyclohexenyl. Y in the meaning of a 5- and/or 6-membered monocyclic or polycyclic aromatic or hetaromatic radical can be one of the radicals described above for X, the radicals preferbly used above for X also being preferred for Y.

In this meaning, the radical Y can be identical to or different from X, subject to the proviso that X must not be unsubstituted phenylene when Y is hydrogen or unsubstituted phenyl.

In particular, Y is a substituted phenyl radical.

The radicals X and Y can be monosubstituted or polysubstituted independently of each other, if polysubstituted by mixed or unmixed substituents, for example by: phenyl, alkyl or cycloalkyl groups having 1 to 6 carbon atoms, halogen, SR, SO₃R, NO₂, NHR, NR₂, NRCOR, OR, OCOR, CHO, COR, COOR, CONR₂, CN. The phenyl alkyl and cycloalkyl substituents can in turn by substituted by the substituents mentioned. In the substituents mentioned, R is hydrogen or a phenyl, alkyl or cycloalkyl radical having 1 to 6 carbon atoms.

In a carbonyl compound

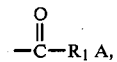

the radical $R_1$ is for example hydrogen or a phenyl, alkyl or cycloalkyl radical having 1 to 6 carbon atoms which in turn can be substituted by radicals R'', for example halogen, SR', SO₃R', NO₂, NHR', NR₂', NR'COR', OR', OCOR', CHO, COR₁, COOR', CONR₂', CN or alkyl having 1 to 6 carbon atoms, where R' is hydrogen or a phenyl, alkyl or cycloalkyl radical having 1 to 6 carbon atoms, or $R_1$ is equal to R''.

Preferably A is a nitrile group.

The cation M is an alkali metal ion or an ammonium ion, for example lithium, sodium or potassium or tetra-$C_1$-$C_6$-alkyl ammonium, such as tetramethylammonium.

The compounds of the formula I are for example bluish to violet compounds which are water-soluble and fade in daylight in the course of 8 to 32 hours.

In the preferred compounds of the formula I, X and Y are each a pyridine, pyridazine, pyrimidine, pyrazine, naphthalene, quinoline, benzothiazole, benzoxazole or benzene radical, A is CN and M is a lithium, sodium, potassium or ammonium ion. Of particular interest is especially that compound in which X is unsubstituted phenylene, Y substituted phenyl, A is cyan and M is a sodium ion.

The application further provides a compound of the formula

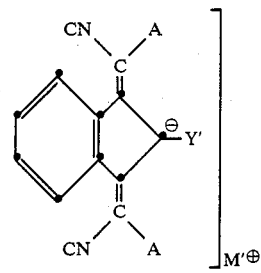
(Ia)

in which Y' is hydrogen or phenyl and M' is an alkali metal ion, preferably sodium. Particular preference is given to the compound of the formula

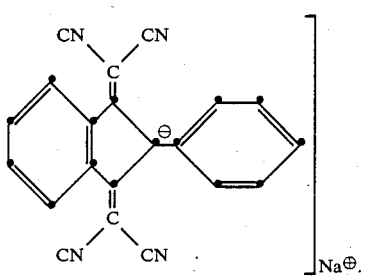
(Ib)

This compound is noteworthy on account of a surprisingly high water solubility and limited light stability.

The preparation of the compounds according to the invention of the formulae I is effected by reacting compounds of the formula

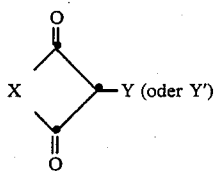

(II)

with compounds of the formula

(III)

in which X, Y or Y' and A are as defined above, in a protic solvent, for example alcohols, glycols, polyols, glycol ethers or alternatively in ethers or benzene or in mixtures thereof, and in the presence of an acid, basic or amphoteric catalyst, for example an inorganic or organic acid or base, or a salt or mixture thereof, in particular a secondary or tertiary amine, metal alcoholate, metal hydroxide, ammonium salt such as ammonium acetate or pyridine being used.

Working up is effected in a conventional manner, for example by precipitating with alkali metal or ammonium salts such as tetra-$C_1$-$C_6$-alkylammonium hydroxide and subsequent filtration.

The reaction is carried out within a temperature range from 10° C. to the boiling point of the particular solvent or mixture.

The compounds of the formulae II and III are known or can be prepared in a known manner.

The invention further relates to the use of the compounds of the formula Ic

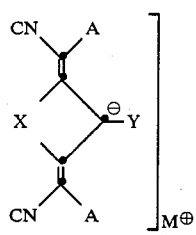

(Ic)

in which X is a substituted or unsubstituted, 5- and/or 6-membered monocyclic or polycyclic aromatic or hetaromatic radical, Y is hydrogen or a substituted or unsubstituted alkenyl, alkyl or cycloalkyl radical having 1 to 6 carbon atoms or a 5- and/or 6-membered monocyclic or polycyclic aromatic or hetaromatic radical, M is an alkali metal or an ammonium ion, A is CN or a carbonyl compound

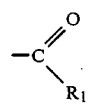

in which $R_1$ is for example hydrogen or a phenyl, alkyl or cycloalkyl radical having 1 to 6 carbon atoms which can in turn be further substituted by radicals R' equal to halogen, SR', $SO_3R'$, $NO_2$, NHR', $NR_2'$, NR'COR', OR', OCOR', CHO, $COR_1$, COOR', $CONR_2'$, CN or alkyl having 1 to 6 carbon atoms, where R' is hydrogen or a phenyl, alkyl or cycloalkyl radical having 1 to 6 carbon atoms, or $R_1$ is equal to R'', as shading dyes.

They can be added to a commercial solid or liquid washing agent of cationic, anionic or neutral character. The amount of shading dye is between 0.0025 to 0.01%, based on the amount of washing agent. If desired, a light stabilizer is also added to the washing agent.

In particular, the compound of the formula

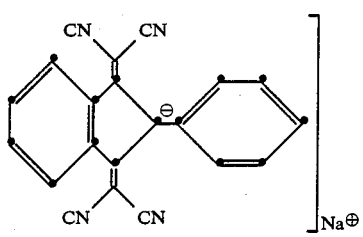

(Ib)

confers a brilliant bluish shade on the wash.

It is also possible to mix various compounds of the formula Ic or to use the compounds of the formula Ic or a mixture of these compounds with known shading dyes, bleaching agents and/or fluorescent brightening agents in form of a mixture.

The shading dyes of the formula Ic or their abovementioned mixtures are added in particular to washing agents for washing textiles made of cellulose or cellulose/polyester blend material.

The advantages of compounds of the formula Ic when used as shading dyes over known shading dyes are the improvement in the optical effect coupled with a high build-up capacity, in particular low accumulation in repeated washes. In addition, the abovementioned compounds are spray-resistant and highly stable in aqueous solution.

In the examples below, which illustrate the invention in more detail without restricting it thereto, parts and percentages are by weight, unless otherwise stated, and melting and boiling points are uncorrected, unless otherwise stated.

EXAMPLE 1

In 100 parts of 2-ethoxyethanol, 13.3 parts of 2-phenylindane-1,3-dione are made to react with 10 parts of malonitrile in the presence of 2 parts of pyridine as catalyst for refluxing for three days.

The crude product is then precipitated at room temperature with saturated sodium chloride solution and filtered off. The filter residue is dissolved in 200 parts of ethyl acetate, the solution is dried with sodium sulphate and filtered, and the filtrate has slowly added to it ether to precipitate 13 parts of pure product of the formula

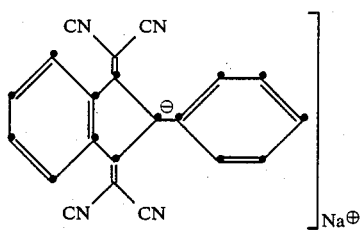

[1]

melting point >270°.

EXAMPLE 2

Example 1 is repeated replacing the 13.3 parts of 2-phenylindane-1,3-dione by 15.3 parts of 2-(4'-chlorophenyl)-indane-1,3-dione to afford the compound of the formula

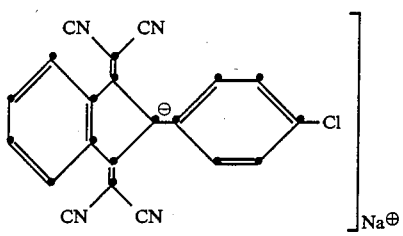

[2]

EXAMPLE 3

Per 100 ml of deionized water are added with efficient stirring the following washing agent components:
10.8 g of Na dodecylbenzenesulfonate
2.2 g of ethoxylated $C_{15}$–$C_{18}$-alcohol (with 9 ethylene oxide)
3.0 g of soap (from behenic acid)
30.0 g of Na tripolyphosphate
5.5 g of Na silicate
1.6 g of carboxymethylcellulose
0.2 g of Na ethylenediaminetetraacetate
37.0 g of Na sulfate This slurry is homogenized and then dried overnight at 60° C. in a vacuum drying cabinet under 200 mmHg. This produces 100 g of a mass which is forced through a sieve of mesh width 0.8 mm. A further sieve having a mesh width of 0.315 mm is used to eliminate the fine, dust-producing portion.

The resulting uniformly grained washing powder A is used for wash tests.

The same method is used to prepare a washing powder B by further adding 0.005 g of the compound [1] prepared as in Example 1 to the components described above. The resulting washing powder B thus contains 0.005% of this blue compound [1].

The same method is used to prepare, as light blue comparative washing powder, a washing agent C by replacing compound [1] by 0.005 g of the Na salt of aluminium-phthalocyanine sulfonic acid.

Wash tests:

3 10-g pieces of bleached cotton fabric which has not previously been subjected to fluorescent brightening are each washed in 200 ml of tap water (12° of German hardness) with 0.8 g of washing agent A or B or C at a liquor temperature of 30° C. for 15 minutes, then rinsed for 30 seconds under running tap water and hung up wet on a washing line for drying outdoors, i.e. by the direct action of sunlight.

The light energy incident on the fabric is monitored using a pyrheliometer (data in langleys). Approximately 2-g pieces are cut out of the cotton cloth after various time intervals, if necessary to be dried to completion in the dark at 60° C. in a drying cabinet, and measured by the Ganz method using a spectrophotometer (RFC 3 from Zeiss) in respect of whiteness and colour difference index (=CDI) (Sh. Ganz, Appl. Optics 19 (1979), 1073–1078).

Results:

The two washing agents B and C confer on the fabric, before exposure to light, a light, bluish shade, compared with washing agent A. The CDIs are:
washing agent A=0.5, i.e. virtually neutral
washing agent B=2.1, i.e. somewhat bluish
washing agent C=2.2, i.e. somewhat bluish This bluish tinge disappears slowly in the case of C and faster in the case of B, which is advantageous to avoid excessive accumulation and excessive tinging when, in practice, repeated wash treatments are employed.

After a wet-state exposure of up to 15 langley the CDI for washing agent B is down to only 1.5 (a trace bluish), while in the case of washing agent C an exposure of up to 170 langley is necessary to reach the same CDI value of 1.5. In the case of washing A (no bluing agent) the CDI remains at 0.5 even after 170 langley.

EXAMPLE 4

The washing agents A (=blank) and B (=with compound [1]) are prepared as in Example 3. The wash tests are carried out under the conditions of Example 3, except that drying in the dark (in a drying cabinet) is employed).

After repeated washing the CDI for washing agent A remains unchanged at 0.5 even after 10 washes. In the case of washing agent B the CDI rises as expected from 2.1 to 3.7 after the 5th wash. However, this bluish shade surprisingly no longer increases after the fifth wash and, on the contrary, is 3.2 after the tenth wash. This limited accumulattion of the shading dye is of great advantage to avoid undesirable discoloration in practice.

EXAMPLE 5

Washing agents A', B' and C' are prepared in accordance with Example 3, except that 0.1 g of a fluorescent brightening agent is added to each of the three washing agents.

The flourescent brightening agent used is the Na salt of distyrylbiphenyldisulfonic acid.

The repeated wash is carried out as in Example 3.

Measurements by the Ganz method produce the following values:

| Washing agent | No. of washes | | | |
| --- | --- | --- | --- | --- |
| | 1 × CDI | 5 × CDI | 10 × CDI | 20 × CDI |
| A' = blank | 79 −0.7 | 231 −0.4 | 242 −0.1 | 246 0.3 |
| B' = 0.005% of compound [1] | 191 0.8 | 248 2.0 | 258 2.1 | 263 2.3 |
| C' = 0.05% of Al PCS | 183 0.5 | 237 2.5 | 248 3.5 | 258 4.5 |

The white effects produced are better with washing agents B' and C' then with A' on account of bluish shading. This advantage is even clearer in the case of washing agent B' (containing compound [1]), owing in particular to the reduced accumulation effect, and the smaller colour shift towards green (CDI).

What is claimed is:

1. A method of bluing fabrics, which method comprises applying an aqueous washing composition which contains an effective amount of a bluing compound of the formula

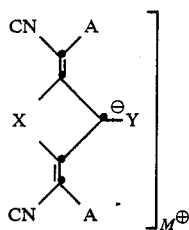

in which X is substituted or unsubstituted, 5- and/or 6-membered monocyclic or polycyclic aromatic radical, Y is a substituted or unsubstituted 5- or 6-membered monocyclic or polycyclic aromatic radical, M is an alkali metal or an ammonium ion, A is CN as shading dye.

2. A method according to claim 1, wherein the bluing compound is of the formula

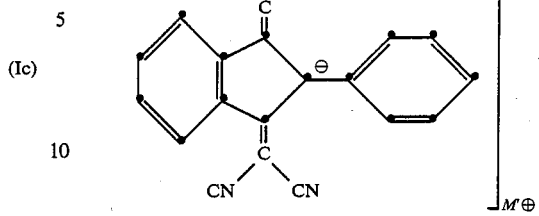

in which M'⊕ is lithium, sodium or potassium.

3. A method according to claim 1, in which M is sodium.

4. A method according to claim 1, wherein the aqueous washing composition comprises a mixture of at least one known shading dye or bleaching agent, fluorescent brightening agents and light stabilizers.

5. A method according to claim 1, wherein the fabrics contain cellulose or cellulose blend material.

6. A solid or liquid washing agent which comprises between 0.0025 to 0.01% of an anionic cyclodiylide compound of the formula

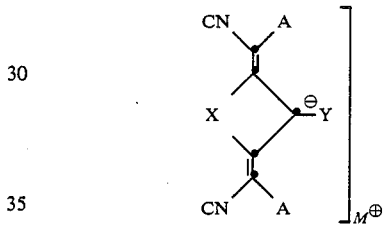

in which X is a substituted or unsubstituted, 5- and/or 6-membered monocyclic or polycyclic aromatic radical, Y is a substituted or unsubstituted 5- or 6-membered monocyclic or polycyclic aromatic radical, M is an alkali metal or an ammonium ion, A is CN as shading dye.

* * * * *